| United States Patent [19] | [11] Patent Number: 4,885,110 |
| --- | --- |
| Böse et al. | [45] Date of Patent: Dec. 5, 1989 |

[54] BRANCHED POLYOXYALKYLENE COPOLYESTERS, A PROCESS FOR THEIR PREPARATION, AND THEIR USE

[75] Inventors: Willibald Böse; Manfred Hofinger, both of Burgkirchen; Martin Hille, Liederbach; Roland Böhm, Kelkheim; Friedrich Staiss, Wiesbaden, all of Fed. Rep. of Germany

[73] Assignee: Hoechst Aktiengesellschaft, Frankfurt am Main, Fed. Rep. of Germany

[21] Appl. No.: 119,817

[22] Filed: Nov. 12, 1987

[30] Foreign Application Priority Data

Nov. 13, 1986 [DE] Fed. Rep. of Germany ....... 3638743

[51] Int. Cl.$^4$ ...................... B01D 17/00; B01D 19/04

[52] U.S. Cl. .................................. 252/341; 252/344; 252/358

[58] Field of Search ............... 252/319, 328, 331, 334, 252/336, 341, 344

[56] References Cited

U.S. PATENT DOCUMENTS 3,009,884 11/1961 Monson et al. ..................... 252/341

Primary Examiner—Josephine Barr

[57] ABSTRACT

Branched polyoxyalkylene copolyesters are described which are prepared by esterifying an oxyalkylated primary fatty amine and an at least trihydric oxyalkylated alkanol or an oxyalkylated polyamine using a dicarboxylic acid or a dicarboxylic anhydride with polycondensation. The novel branched polyoxyalkylene copolyesters are used as demulsifiers for breaking crude oil emulsions.

11 Claims, No Drawings

BRANCHED POLYOXYALKYLENE COPOLYESTERS, A PROCESS FOR THEIR PREPARATION, AND THEIR USE

DESCRIPTION

The invention relates to branched polyoxyalkylene copolyesters, a process for their preparation, and their use as demulsifiers for crude oil emulsions.

In the recovery of crude oil emulsions, dilution of the recovered crude oils with water occurs to an increasing extent. This water which is also recovered forms a water-in-oil emulsion with the crude oil. Salts such as sodium chloride, calcium chloride and magnesium chloride may be dissolved in the emulsified water. This emulsion water must be removed before transport. The salt content is further reduced before distillation in the refineries by further emulsion formation with fresh water and by demulsification. If the salt content in the crude oil is too high, this can lead to problems and corrosion in the refineries.

A demulsifier has the task of breaking the emulsion at the lowest possible application concentration and to effect complete water removal in this separation process, if possible without or with minimal additional expenditure of heat, and to reduce the salt content to a minimum. The quality criteria for crude oil supplied are the residual salt and the water content.

Depending on their origin, crude oils have various compositions. Natural emulsion stabilizers have a complicated, differentiated chemical structure. In order to overcome their action, it is necessary to develop selective demulsifiers.

Various transport and processing conditions make the demands which are placed on a demulsifier even more manifold.

The constant exploitation of new oil fields and the change in the recovery conditions of older oil fields means that the development of optimum demulsifiers is an acute problem and a large number of demulsifiers or demulsifier mixtures having different structures is required.

U.S. Pat. No. 3,009,884 discloses branched polyoxyalkylene polyesters which have been prepared by esterifying an oxyalkylated polyamine using a dicarboxylic acid, either simply or with polycondensation. They are recommended as demulsifiers for crude oil emulsions (crude oil crackers). However, these polyesters have the disadvantage of increased water solubility (hydrophilia), i.e. their oil solubility (oleophilia) is too low. Since, however, the effectiveness of demulsifiers for breaking crude oil emulsions depends on the degree of presence at the oil/water interface, this property is disadvantageous since a too high proportion of the demulsifier is distributed over the entire aqueous phase.

Through the present invention, novel branched polyoxyalkylene polyesters, to be precise branched, polyoxyalkylene copolyesters, which are particularly effective demulsifiers for crude oil emulsions are prepared. The branched polyoxyalkylene copolyesters according to the invention have been prepared by esterifying an oxyalkylated primary fatty amine of the formula

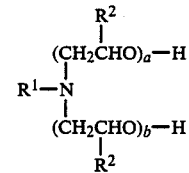

in which $R^1$ is an alkyl radical or alkylene radical having 8 to 23 carbon atoms, $R^2$ is H or $CH_3$ and, within the polyoxyalkylene radical chain, arranged in blocks, can also adopt both meanings, and a and b are identical or different and are integers or fractions with a total of 2 to 30, with the proviso that neither a nor b is zero, and an at least trihydric alkanol or a polyamine in each case containing 5 to 30, preferably 15 to 25, ethylene oxide units, 5 to 30, preferably 15 to 25, propylene oxide units, or 3 to 20, preferably 5 to 15, ethylene oxide units and 5 to 30, preferably 15 to 25, propylene oxide units per acidic H atom, using a dicarboxylic acid or a dicarboxylic anhydride, with polycondensation, the oxyalkylated fatty amine, the oxyalkylated polyhydric alkanol or the oxyalkylated polyamine, and the dicarboxylic acid or the dicarboxylic anhydride being employed in the molar ratio 1:0.01:0.5 to 1:1:3, preferably 1:0.1:0.9 to 1:0.5:1.5.

Preferred oxyalkylated, primary fatty amines of the abovementioned formula are those where $R^1$ is an alkyl radical having 12 to 18 carbon atoms, $R^2$ is H and a and b are identical or different and are integers or fractions with a total of 2 to 15, taking into account the abovementioned proviso.

Oxyalkylation of primary fatty amines is well known and can be carried out by one of the methods for oxyalkylation of acidic (active) H atom-carrying compounds. According to the meanings of $R^2$, the oxyalkylated fatty amines can carry units of ethylene oxide or propylene oxide or units of ethylene oxide and propylene oxide arranged in a block, the ethoxylated, i.e. carrying only ethylene oxide units, primary fatty amines being preferred. According to the meanings of $R^1$, the fatty amines employed for the oxyalkylation can be single primary fatty amines or mixtures thereof. They may also be fatty amines whose hydrocarbon chain contains one or more double bonds, such as the radicals of oleic, elaidic, linolic or linoleic acid. The preferred primary fatty amines are industrially available products, such as stearylamine, coconut acid fatty amine or tallow fatty amine (these industrial products contain alkyl radicals essentially having 12 to 18 carbon atoms).

The oxyalkylated, at least trihydric alkanol is preferably one from the group comprising glycerol, erythritol, pentaerythritol, trimethylolethane, trimethylolpropane, 1,3,5-hexanetriol, pentitol and hexitol, glycerol, pentaerythritol and trimethylolpropane being particularly preferred. The oxyalkylated polyols have 5 to 30, preferably 15 to 25, ethylene oxide units or 5 to 30, preferably 15 to 25, propylene oxide units, or 3 to 20, preferably 5 to 15, ethylene oxide units and 5 to 30, preferably 15 to 25, propylene oxide units per acidic H atom, i.e. per OH group. In the case of ethylene oxide and propylene oxide units, these are attached randomly or in blocks, preferably in blocks. Of the possible oxyalkylated alkanols, those are preferred which contain ethylene oxide and propylene oxide, and do so in blocks. Of these, those ethylene oxide/propylene oxide blocks are in turn preferred which comprise a first propylene oxide block having 5 to 30, preferably 15 to 25, propylene oxide units and a subsequent ethylene oxide block having 3 to 20, preferably 5 to 15, ethylene oxide units (per acidic H atom).

The oxyalkylated polyamine is preferably one from the group comprising ethylenediamine, diethylenetriamine, triethylenetetramine, tetraethylenepentamine and pentaethylenehexamine, and also the corresponding propylenepolyamines, ethylenediamine, propylenediamine, diethylenetriamine, triethylenetetramine, tetraethylenepentamine and the corresponding polypropylene polyamines being particularly preferred. Like the oxyalkylated polyols, the oxyalkylated polyamines have 5 to 30, preferably 15 to 25, ethylene oxide units or 5 to 30, preferably 15 to 25, propylene oxide units, or 3 to 20, preferably 5 to 15, ethylene oxide units and 5 to 30, preferably 15 to 25, propylene oxide units per acidic H atom. In the case of ethylene oxide and propylene oxide units, these are attached randomly or in blocks, preferably in blocks. Of the possible oxyalkylated polyamines, those are preferred which contain ethylene oxide and propylene oxide, and do so in blocks. Of these, those ethylene oxide/propylene oxide blocks are also preferred here which in turn comprise a first propylene oxide block having 5 to 30, preferably 15 to 25, propylene oxide units and a subsequent ethylene oxide block having 3 to 20, preferably 2 to 15, ethylene oxide units (per acidic H atom).

Like the abovementioned oxyalkylation of fatty amines, the oxyalkylation of the polyols and polyamines in question is well known and can be carried out by one of the methods for oxyalkylation of active H atom-carrying compounds.

The dicarboxylic acids to be employed may be aromatic or aliphatic. The aliphatic dicarboxylic acids may be saturated or unsaturated. The aromatic dicarboxylic acid is preferably phthalic acid (benzene-ortho-dicarboxylic acid). The aliphatic saturated dicaroxylic acid is preferably one having $C_1$- to $C_8$-alkylene groups, in particular having $C_2$- to $C_4$-alkylene groups, such as malonic acid, succinic acid, glutaric acid, adipic acid, pimelic acid, suberic acid, azelaic acid and sebacic acid. The aliphatic unsaturated dicarboxylic acid is preferably fumaric acid or maleic acid. Of the dicarboxylic acids mentioned, the aliphatic saturated dicarboxylic acids and maleic acid are preferred. With respect to the dicarboxylic anhydrides which can be employed in place of the acids, the same applies which has already been stated with respect to the dicarboxylic acids.

The polyoxyalkylene copolyesters according to the invention are prepared by esterifying an oxyalkylated fatty amine of the type mentioned and an oxyalkylated alkanol or an oxyalkylated polyamine of the type mentioned using a dicarboxylic acid or a dicarboxylic anhydride of the type mentioned, the fatty amine, the alkanol or the polyamine and the dicarboxylic acid or dicarboxylic anhydride being employed in the molar ratio 1:0.01:0.5 to 1:1:3, preferably 1:0.1:0.9 to 1:0.5:1.5.

The esterification of the oxyalkylated fatty amines and oxyalkylated polyols or polyamines using a dicarboxylic acid or a dicarboxylic anhydride, which proceeds with polycondensation, is carried out using a higher-boiling, inert solvent, such as toluene or xylene, or without a solvent in the melt, and under cover of a protective gas, the esterification preferably being carried out in the melt. In the case of esterification in a solvent, the reaction temperature selected is expediently the reflux temperature of the reaction mixture and the water of reaction formed is removed by azeotropic distillation. In the case of esterification without a solvent, the water of reaction is discharged (removed by distillation) directly from the reaction mixture. The reaction temperatures here are 140° to 220° C., preferably 160° to 180° C. As is conventional in esterification reactions, an acid catalyst is used to accelerate the reaction. The course and end of the reaction can be checked by means of the water of reaction produced or by determining the amine and acid value. The resultant polyalkylene copolyesters according to the invention are yellow to brown liquids of varying viscosities.

A preferred process for the preparation of the novel, branched polyoxyalkylene copolyesters is described below in greater detail.

The oxyalkylated fatty amine, the oxyalkylated alkanol or the oxyalkylated polyamine, and the dicarboxylic acid or anhydride, and also an acid catalyst, are introduced into a reaction vessel. Suitable acid catalysts are hydrohalic acids, such as hydrochloric acid or hydrobromic acid, phosphoric acids, such as hypophosphorous acid or orthophosphoric acid, sulfuric acid, sulfonic acids, such as methanesulfonic acid, para-toluenesulfonic acid or dodecylbenzenesulfonic acid, haloacetic acids, such as trichloroacetic acid or trifluoroacetic acid, and mixtures thereof. Hydrochloric acid, phosphoric acid and sulfonic acids are preferred. The amount of acid catalyst is generally 0.05 to 5% by weight, preferably 0.1 to 1% by weight, relative to the total weight of the three reaction components initially introduced. The mixture introduced into the reaction vessel is heated to 140° to 220° C., preferably 160° to 180° C., with stirring and while passing through an inert gas, preferably nitrogen, in order to produce an inert gas atmosphere, and is kept at this temperature (reaction temperature, esterification temperature) until the reaction is complete, while continuously removing the water produced. The course and end of the reaction can be checked by one of the methods described above. The reaction product, which can, if desired, be washed with water in order to remove the catalyst employed, is a yellow to brown liquid of varying viscosity and is the branched polyoxyalkylene copolyester according to the invention. The reaction time is in the range 5 to 30 hours.

The branched polyoxyalkylene copolyesters according to the invention having the three components, namely oxyalkylated, at least trihydric alkanol or oxyalkylated polyamine, oxyalkylated fatty amine and dicarboxylic acid, have specific chemical characteristics and a highly branched structure. They have a viscosity of 2,000 to 50,000 mPa.s, preferably 4,000 to 30,000 mPa.s.

The branched polyoxyalkylene copolyesters according to the invention are distinguished by a strong demulsifying action. At conventional crude oil processing temperatures, complete removal of water and reduction of the salt content is achieved even after a short separation time. Delivery-specific crude oils are thus obtained using the novel oil demulsifiers at conventional processing temperatures after a short separation time. The amount of the demulsifier according to the invention which is used can vary within broad limits. It depends, in particular, on the type of the crude oil and on the processing temperature. The effective amount is generally 5 to 100 g per tonne, preferably 10 to 50 g per tonne. The novel demulsifiers are preferably employed in solution in order to achieve better dispensing and distribution. Suitable solvents are water or organic solvents, such as alcohols, for example methanol, isopropanol and butanol, aromatic hydrocarbons, for example toluene and xylene, and commercially available mixtures of higher aromatics.

The invention is now illustrated in greater detail by means of examples.

EXAMPLE 1

230.0 g (0.35 mol) of a tallow fatty amine containing (on average) 10 mol of ethylene oxide, 58.3 g (0.40 mol) of adipic acid and 650.0 g (0.14 mol) of a glycerol block oxyalkylate containing (on average) per acidic H atom 22.7 mol of propylene oxide as the first block and 5.0 mol of ethylene oxide as the second block, and also 4 ml of 37% strength by weight hydrochloric acid and 1 ml of 50% strength by weight hypophosphorous acid as the esterification catalyst (i.e. 0.20% by weight of hydrochloric acid and 0.10% by weight of hypophosphorous acid, percentages by weight in each case relative to the initial reaction mixture of ethoxylate tallow fatty amine, adipic acid and glycerol block oxyalkylate), were introduced into a 1 liter three-neck flask equipped with stirrer, water separator and internal thermometer. The molar ratio between the reaction components to be reacted, the ethoxylated fatty amine, the glycerol block oxyalkylate and adipic acid was thus 1:0.4:1.14.

The flask contents were heated to 180° C. with stirring and while passing through nitrogen in order to maintain a nitrogen atmosphere, and kept at this reaction temperature for 20 hours while stirring and under a water-pump vacuum, water of reaction being removed continuously. After the reaction time specified, the esterification reaction according to the invention was ended. The reaction product was brown and viscous. The branched polyoxyalkylene copolyester according to the invention thus obtained had a viscosity of 5,200 mPa.s at 25° C.

EXAMPLE 2

Batch: 280.0 g (0.30 mol) of stearylamine containing 15 mol of ethylene oxide, 353.0 g (0.06 mol) of glycerol block oxyalkylate analogously to Example 1 containing 22.7 mol of propylene oxide and 14 mol of ethylene oxide, 43.9 g (0.30 mol) of adipic acid and an esterification catalyst as in Example 1. The molar ratio between the reaction components to be reacted was thus 1:0.2:1.

The esterification was carried out as in Example 1, with the difference that a reaction time of 28 hours was used. The reaction product was brown and viscous. The viscosity of the resultant branched polyoxyalkylene copolyester according to the invention was 4,600 mPa.s. at 25° C.

EXAMPLE 3

Batch: 263.0 g (0.40 mol) of tallow fatty amine containing 10 mol of ethylene oxide, 410.0 g (0.07 mol) of pentaerithritol block oxyalkylate containing (on average) 18.5 mol of propylene oxide as the 1st block and 7 mol of ethylene oxide as the 2nd block per acidic H atom, 58.3 g (0.40 mol) of adipic acid and 5 ml of 85% strength by weight orthophosphoric acid as catalyst. The molar ratio between the reaction components to be reacted was thus 1:0.18:1.

The reaction was carried out as in Example 1, with the difference that a reaction time of 12 hours was used. The reaction product was brown and viscous. The viscosity of the resultant branched polyoxyalkylene copolyester according to the invention was 10,600 mPa.s at 25° C.

EXAMPLE 4

Batch: 148.0 g (0.40 mol) of tallow fatty amine containing 2 mol of ethylene oxide, 704.0 g (0.14 mol) of pentaerithritol block oxyalkylate analogous to Example 3 containing 16 mol of propylene oxide and 6.5 mol of ethylene oxide, 70.2 g (0.48 mol) of adipic acid and 2 ml of methanesulfonic acid as catalyst. The molar ratio between the reaction components to be reacted was thus 1:0.35:1.2.

The reaction was carried out as in Example 1 with the difference that a reaction temperature of 160° C. and a reaction time of 12 hours were used. The resultant branched polyoxyalkylene copolyester according to the invention, which was brown and viscous, had a viscosity of 4,800 mPa.s at 25° C.

EXAMPLE 5

Batch: 150.0 g (0.5 mol) of coconut acid fatty amine containing 2 mol of ethylene oxide, 519.0 g (0.13 mol) of trimethylolpropane block oxyalkylate containing 19 mol of propylene oxide as the 1st block and 5.3 mol of ethylene oxide as the 2nd block per acidic H atom, 46.6 g (0.48 mol) of maleic anhydride and 3.5 ml of methanesulfonic acid as catalyst. The molar ratio between the reaction components to be reacted was thus 1:0.25:0.95.

The reaction was carried out as in Example 1, with the difference that the batch was initially kept for 1 hour at only 140° C. without vacuum in order to prevent sublimation of the maleic anhydride, and subsequently a temperature of 160° C. was maintained for 8 hours under a water-pump vacuum. The resultant branched polyoxyalkylene copolyester according to the invention, which was brown and viscous, had a viscosity of 28,000 mPa.s at 25° C.

EXAMPLE 6

Batch: 119.0 g (0.2 mol) of stearylamine containing 8 mol of ethylene oxide, 520.0 g (0.1 mol) of ethylenediamine block oxyalkylate containing (on average) 18.8 mol of propylene oxide as the 1st block and 5.0 mol of ethylene oxide as the 2nd block per acidic H atom, 19.6 g (0.2 mol) of maleic anhydride and 4 ml of 37% strength by weight hydrochloric acid and 1 ml of 50% strength by weight hypophosphorous acid as catalyst. The molar ratio between the reaction components to be employed was thus 1:0.5:1.

The reaction was carried out as in Example 5. The reaction product was brown and viscous. The viscosity of the branched polyoxyalkylene copolyester according to the invention thus obtained was 30,000 mPa.s at 25° C.

EXAMPLE 7

Batch: 252.0 g (0.40 mol) of coconut fatty amine containing 10 mol of ethylene oxide, 418.0 g (0.08 mol) of ethylenediamine block oxyalkylate as in Example 6, 73.1 g (0.44 mol) of phthalic acid and 3.4 ml of methanesulfonic acid and 1 ml of 50% strength by weight hypophosphorous acid as catalyst. The molar ratio between the reaction components to be employed was thus 1:0.2:1.1.

The reaction was carried out as in Example 1, with the difference that a reaction temperature of 170° C. and a reaction time of 18 hours were used. The resultant branched polyoxyalkylene copolyester according to the invention, which was brown and viscous, had a viscosity of 6,800 mPa.s at 25° C.

EXAMPLE 8

Batch: 263.0 g (0.40 mol) of tallow fatty amine containing 10 mol of ethylene oxide, 310.0 g (0.04 mol) of tetraethylenepentamine block oxyalkylate containing 15.0 mol of propylene oxide as the 1st block and 6 mol of ethylene oxide as the 2nd block per acidic H atom, 63.1 g (0.38 mol) of phthalic acid and 3.3 ml of 37% strength by weight hydrochloric acid and 1 ml of 50% strength by weight hypophosphorous acid as catalyst. The molar ratio between the reaction components to be employed was thus 1:0.1:0.95.

The reaction was carried out as in Example 7, with the difference that a reaction time of 12 hours was used. The reaction product was brown and viscous. The viscosity of the resultant branched polyoxyalkylene copolyester according to the invention was 20,600 mPa.s at 25° C.

Although oxyalkylation of compounds carrying acidic H atoms, such as fatty amines, alkanols and polyamines, has long been well known, the preparation of the oxyalkylated fatty amines, alkanols and oxyalkylated polyamines to be employed according to the invention is nevertheless described here briefly: oxyalkylation of the compounds in question is generally carried out by charging the compound with the oxyalkylating agent, i.e. ethylene oxide and/or propylene oxide, at a temperature of 100° to 150° C. in the presence of a basic catalyst, preferably potassium hyroxide or sodium hydroxide, in an amount of about 0.1 to 5% by weight, relative to the total amount of the compound to be oxyalkylated, the pressure arising from the reaction components at the reaction temperature being produced. The end of the reaction can be detected, for example, from the decreased and constant pressure. If desired, the oxyalkylated compound can be freed from the catalyst, for example by washing with water.

The branched polyoxyalkylene copolyesters of Examples 1 to 8 according to the invention have been tested with respect to various crude oil emulsions. The test results are collated in Tables I and II below. They show the high demulsifying action of the products according to the invention.

TABLE I

| Origin of the crude oil emulsion: | | | | | | | Emsland (Federal Republic of Germany) |
|---|---|---|---|---|---|---|---|
| Water content of the crude oil emulsion: | | | | | | | 56.5% of volume |
| Salt content of the crude oil emulsion: | | | | | | | 9.46% by weight |
| Demulsification temperature: | | | | | | | 48° C. |
| Amount dispensed: | | | | | | | 28 ppm |

| Product from example | Water separation in % by volume after hours | | | | | | Residual salt content in % by weight in the oil phase |
|---|---|---|---|---|---|---|---|
| | 1 | 3 | 6 | 9 | 12 | 18 | 24 | |
| 1 | 31 | 48 | 64 | 82 | 98 | 99 | 100 | 0.04 |
| 2 | 3 | 40 | 79 | 88 | 96 | 98 | 99 | 0.06 |
| 3 | 58 | 59 | 61 | 64 | 73 | 100 | 100 | 0.01 |
| 4 | 3 | 6 | 9 | 95 | 98 | 99 | 100 | 0.02 |
| 5 | 8 | 11 | 14 | 41 | 83 | 99 | 100 | 0.02 |
| Blank value | 0 | 0 | 0 | 0 | 0 | 0 | 0 | 5.63 |

TABLE II

| Origin of the crude oil emulsion: | | | | | | | Borneo |
|---|---|---|---|---|---|---|---|
| Water content of the crude oil emulsion: | | | | | | | 26.8% by volume |
| Demulsification temperature: | | | | | | | 38° C. |
| Amount dispensed: | | | | | | | 34 ppm |

| Product from example | Water separation in % by volume after hours | | | | | | Residual salt content in % by weight in the oil phase |
|---|---|---|---|---|---|---|---|
| | 10 | 20 | 30 | 60 | 90 | 120 | 180 | |
| 3 | 62 | 66 | 72 | 80 | 93 | 98 | 100 | 0.08 |
| 5 | 30 | 38 | 44 | 59 | 88 | 98 | 99 | 0.18 |
| 6 | 41 | 48 | 57 | 73 | 85 | 95 | 99 | 0.20 |
| 7 | 43 | 64 | 83 | 97 | 98 | 99 | 100 | 0.14 |
| 8 | 5 | 58 | 83 | 98 | 99 | 100 | 100 | 0.06 |
| Blank value | 0 | 0 | 0 | 0 | 0 | 0 | 0 | 4.85 |

We claim:

1. A branched polyoxyalkylene copolyester, said copolyester having been prepared by esterifying an OH-containing component and a dicarboxylic component in the presence of a mineral acid or carboxylic acid esterification catalyst while removing the water of reaction, the esterification reaction being carried out in the melt at a temperature of 160° to 180° C., said OH-containing component consisting essentially of:

an oxyalkylated primary fatty amine of formula

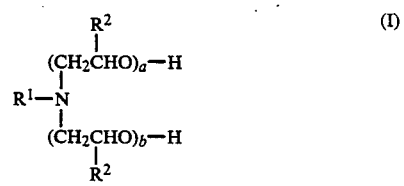

(I)

in which $R^1$ is an alkyl radical or alkylene radical having 8 to 23 carbon atoms;

$R^2$ is H, in which case the polyoxyalkylene radicals of Formula I are polyoxyethylene, or $R^2$ is $CH_3$, in which case the polyoxyalkylene radicals of formula I are polyoxypropylene, or $R^2$ is both H and $CH_3$, in which case the polyoxyalkylene radicals of Formula I are the same or different and can carry blockwise-arranged units of ethylene oxide and propylene oxide; and a and b are identical or different and are integers or fractions with a total of 2 to 30, with the proviso that neither a nor b is zero; and an alkoxylated polyhydric alkanol having 3 to 6 OH groups or an alkoxylated, at least trifunctional polyamine, which in each case contains 5 to 30 ethylene oxide units, 5 to 30 propylene oxide units, or 3 to 20 ethylene oxide units and 5 to 30 propylene oxide units per acid H atom, said dicarboxylic component consisting essentially of a dicarboxylic acid or a dianhydride thereof, said dicarboxylic acid being malonic, succinic, glutaric, adipic, pimelic, suberic, azelaic, sebacic, fumaric, maleic, or phthalic acid;

the oxyalkylated primary fatty amine, the alkoxylated polyhydric-alkanol or polyamine reactant, and the dicarboxylic component being employed in the molar ratio 1:0.01:0.5 to 1:1:3.

2. A branched polyoxyalkylene copolyester as claimed in claim 1, wherein the trihydric alkanol and the polyamine contain 15 to 25 ethylene oxide units, 15 to 25 propylene oxide units, or 5 to 15 ethylene oxide units and 15 to 25 propylene oxide units per acidic H atom, the alkanol being glycerol, erythritol, pentaerythritol, trimethylolethane, trimethylolpropane, 1,3,5-hexanetriol, a pentitol or a hexitol, and the polyamine being ethylenediamine, diethylenetriamine, triethylenetetramine, tetraethylenepentamine, pentaethylenehexamine or a corresponding propylenepolyamine, and wherein the dicarboxylic acid is malonic acid, succinic acid, glutaric acid, adipic acid, pimelic acid, suberic acid, azelaic acid, sebacic acid, fumaric acid, maleic acid or phthalic acid, and the dicarboxylic anhydride is an anhydride of the dicarboxylic acids mentioned.

3. A branched polyoxyalkylene copolyester as claimed in claim 1, wherein the trihydric alkanol and the polyamine contain 15 to 25 ethylene oxide units, 15 to 25 propylene oxide units, or 5 to 15 ethylene oxide units and 15 to 25 propylene oxide units per acidic H atom, the alkanol being glycerol, pentaerythritol or trimethylolpropane, and the polyamine being ethylenediamine, diethylenetriamine, triethylenetetramine, tetraethylenepentamine or a corresponding propylenepolyamine, and wherein the dicarboxylic acid is succinic acid, glutaric acid, adipic acid, maleic acid or phthalic acid, and the dicarboxylic anhydride is an anhydride of the dicarboxylic acids mentioned.

4. A branched polyoxyalkylene copolyester as claimed in claim 1, wherein the oxyalkylated fatty amine employed is one which arises when $R^1$ is an alkyl radical having 12 to 18 carbon atoms, $R^2$ is H, and a and b are identical or different and are integers or fractions with a total of 2 to 15, the oxyalkylated trihydric alkanol is glycerol, pentaerythritol or trimethylolpropane containing a first block made from 15 to 25 propylene oxide units and a subsequent block made from 5 to 15 ethylene oxide units, the oxyalkylated polyamine is ethylenediamine, diethylenetriamine, triethylenetetramine, tetraethylenepentamine or a corresponding propylene polyamine containing a first block made from 15 to 25 propylene oxide units and a subsequent block made from 5 to 15 ethylene oxide units, and the dicarboxylic acid or dicarboxylic anhydride is succinic acid, glutaric acid, adipic acid, maleic acid or phthalic acid or an anhydride of these dicarboxylic acids.

5. A process for breaking crude oil emulsions, wherein an effective amount of a branched polyoxyalkylene copolyester as claimed in claim 1 is added to the crude oil emulsions.

6. A polyoxyalkylene copolyester as claimed in claim 1, wherein said OH-containing component consists essentially of the oxyalkylated primary fatty amine and an alkoxylated polyhydric alkanol having 3 to 6 OH groups.

7. A polyoxyalkylene copolyester as claimed in claim 1, wherein the polyhydric alkanol is glycerol, erythritol, pentaerythritol, trimethylolethane, trimethylolpropane, 1,3,5-hexanetriol, a pentitol or a hexitol.

8. A polyoxyalkylene copolyester as claimed in claim 7, wherein said copolyester is obtained from said oxyalkylated primary fatty amine, said alkoxylated polyhydric alkanol, and the dicarboxylic component.

9. A polyoxyalkylene copolyester as claimed in claim 7, wherein the molar ratio of oxyalkylated primary fatty amine to alkoxylated polyhydric alkanol to dicarboxylic component is 1:0.1:0.9 to 1:0.5:1.5.

10. A polyoxyalkylene copolyester as claimed in claim 6, wherein the molar ratio of oxyalkylated primary fatty amine to alkoxylated polyhydric alkanol to dicarboxylic acid component is 1:0.1:0.9 to 1:0.5:1.5.

11. A polyoxyalkylene copolyester as claimed in claim 6, wherein the esterification catalyst is a hydrohalic acid, a phosphoric acid, sulfuric acid, a sulfonic acid, a haloacetic acid, or a mixture thereof.

* * * * *